United States Patent
Torii et al.

(10) Patent No.: US 9,782,736 B2
(45) Date of Patent: Oct. 10, 2017

(54) METHOD AND DEVICE FOR PRODUCING MICRODROPLETS

(71) Applicant: JAPAN SCIENCE AND TECHNOLOGY AGENCY, Kawaguchi-shi (JP)

(72) Inventors: Toru Torii, Suginami-ku (JP); Toshiro Higuchi, Yokohama (JP); Takashi Nishisako, Taitou-ku (JP); Shingo Okushima, Setagaya-ku (JP)

(73) Assignee: JAPAN SCIENCE AND TECHNOLOGY AGENCY, Kawaguchi-shi (JP)

(*) Notice: Subject to any disclaimer, the term of this patent is extended or adjusted under 35 U.S.C. 154(b) by 140 days.

(21) Appl. No.: 14/262,306

(22) Filed: Apr. 25, 2014

(65) Prior Publication Data

US 2014/0230913 A1 Aug. 21, 2014

Related U.S. Application Data (62) Division of application No. 10/593,783, filed as application No. PCT/JP2005/004522 on Mar. 15, 2005, now Pat. No. 8,741,192.

(30) Foreign Application Priority Data

Mar. 23, 2004 (JP) .................. 2004-083802

(51) Int. Cl.
*B01F 13/00* (2006.01)
*B01F 3/08* (2006.01)
(Continued)

(52) U.S. Cl.
CPC ........ *B01F 13/0071* (2013.01); *B01F 3/0807* (2013.01); *B01F 5/0471* (2013.01);
(Continued)

(58) Field of Classification Search
CPC ............ A61K 9/10; A61K 2039/55555; A61K 47/488; A61K 8/062; A61K 8/11;
(Continued)

(56) References Cited

U.S. PATENT DOCUMENTS 6,149,787 A   11/2000 Chow et al.
7,268,167 B2   9/2007 Higuchi et al.
(Continued)

FOREIGN PATENT DOCUMENTS

JP   2001 517545   10/2001
JP   2004 122107   4/2004
(Continued)

*Primary Examiner* — Jeffrey Washville
(74) *Attorney, Agent, or Firm* — Oblon, McClelland, Maier & Neustadt, L.L.P.

(57) ABSTRACT

A method and an apparatus for producing various types of microdroplets are provided. The apparatus has a cross intersection portion 7 at which a first continuous phase 2, a first dispersion phase 4, and a second dispersion phase 6 intersect with each other; a first liquid feed device 12 controlling the first dispersion phase 4; a second liquid feed device 13 controlling the second dispersion phase 6; and a control device 11 connected to the first liquid feed device 12 and the second liquid feed device 13, in which the first liquid feed device 12 and the second liquid feed device 13 are controlled by a signal from the control device 11 so that microdroplets 9 formed of the first dispersion phase 4 and microdroplets 10 formed of the second dispersion phase 6 are sequentially produced.

8 Claims, 8 Drawing Sheets

(51) Int. Cl.
 *B01F 5/04* (2006.01)
 *B01F 15/00* (2006.01)
 *B01J 13/04* (2006.01)
(52) U.S. Cl.
 CPC .... *B01F 13/0062* (2013.01); *B01F 15/00253* (2013.01); *B01J 13/04* (2013.01); *Y10T 137/0391* (2015.04); *Y10T 428/2982* (2015.01)
(58) Field of Classification Search
 CPC . A61K 9/127; A61K 9/1273; B01L 3/502784; B01L 2300/0867; B01L 3/502792; B01L 2400/0406; B01L 2200/0636; B01L 9/527
 USPC ...... 428/402–402.24, 403, 404, 407, 321.14, 428/74.4; 604/500; 422/70, 99, 100, 422/101; 427/331, 389.9, 212, 427/213.3–213.36, 483, 256
 See application file for complete search history.

(56) References Cited

U.S. PATENT DOCUMENTS

| | | | |
|---|---|---|---|
| 7,595,195 B2 | 9/2009 | Lee et al. | |
| 2000/0058332 | 5/2002 | Quake et al. | |
| 2002/0058332 A1* | 5/2002 | Quake | B01L 3/502784 435/288.5 |
| 2004/0068019 A1* | 4/2004 | Higuchi | B01F 3/0807 516/9 |
| 2005/0032240 A1* | 2/2005 | Lee | B01F 3/0807 436/180 |

FOREIGN PATENT DOCUMENTS

| | | |
|---|---|---|
| JP | 2004 237177 | 8/2004 |
| WO | 02 068104 | 9/2002 |

\* cited by examiner

METHOD AND DEVICE FOR PRODUCING MICRODROPLETS

CROSS-REFERENCE OF RELATED APPLICATIONS

This application is a divisional application of Ser. No. 10/593,783, filed Feb. 2, 2007, which is a National Stage of PCT/JP05/04522 filed Mar. 15, 2005, and claims the benefit of priority under 35 U.S.C. §119 of Japanese Application NO. 2004-083802 filed Mar. 23, 2004. The entire contents of each are incorporated herein by reference.

TECHNICAL FIELD

The present invention relates to a method and an apparatus for producing microdroplets, and more particularly, relates to a method and an apparatus for producing double emulsion-microcapsules.

BACKGROUND ART

The inventors of the present invention have already filed a patent application relating to a method for producing emulsions and microcapsules and an apparatus therefor as the following Patent Document 1.
Patent Document 1: WO 02/068104 A1

DISCLOSURE OF INVENTION

The above prior art on production of microdroplets was further improved, and an object of the present invention is to provide a method and an apparatus for producing microdroplets with various embodiments.

To these ends, the present invention provides the following.

[1] There is provided a method for producing microdroplets, comprising the step of allowing a first dispersion phase and a second dispersion phase to act on a first continuous phase at an intersection portion among the first continuous phase, the first dispersion phase, and the second dispersion phase, whereby the microdroplets are sequentially produced.

[2] In the method for producing microdroplets according to the above [1], the intersection portion is a cross intersection portion.

[3] In the method for producing microdroplets according to the above [1], the intersection portion includes T-shaped intersection portions, the T-shaped intersection portions being located at positions shifted from each other.

[4] In the method for producing microdroplets according to the above [1], microdroplets formed of the first dispersion phase are different from microdroplets formed of the second dispersion phase.

[5] In the method for producing microdroplets according to the above [2], the first dispersion phase and the second dispersion phase are allowed to alternately act on at predetermined time intervals so that microdroplets having uniform sizes and different components are alternately produced at a regular period.

[6] In the method for producing microdroplets according to the above [3], the first dispersion phase and the second dispersion phase are allowed to alternately act on at predetermined time intervals so that microdroplets having uniform sizes and different components are alternately produced at a regular period.

[7] In the method for producing microdroplets according to the above [5] or [6], the period is changeable.

[8] There is provided a method for producing microdroplets, comprising the steps of: allowing a first dispersion phase and a second dispersion phase to act on a first continuous phase at a cross intersection portion among the first continuous phase, the first dispersion phase, and the second dispersion phase so as to sequentially produce different microdroplets; and supplying a liquid containing the different microdroplets to another cross intersection portion to which the first continuous phase and a second continuous phase are supplied, whereby double emulsion-microcapsules are produced.

[9] There is provided an apparatus for producing microdroplets, comprising: an intersection portion at which a first continuous phase, a first dispersion phase, and a second dispersion phase intersect with each other; a first liquid feed device controlling the first dispersion phase; a second liquid feed device controlling the second dispersion phase; and a control device connected to the first liquid feed device and the second liquid feed device, in which the first liquid feed device and the second liquid feed device are controlled by a signal from the control device so that microdroplets formed of the first dispersion phase and microdroplets formed of the second dispersion phase are sequentially produced.

[10] In the apparatus for producing microdroplets according to the above [9], the intersection portion is a cross intersection portion.

[11] In the apparatus for producing microdroplets according to the above [9], the intersection portion includes T-shaped intersection portions, the T-shaped intersection portions being located at positions shifted from each other.

[12] In the apparatus for producing microdroplets according to the above [10], by the signal from the control device, microdroplets having uniform sizes and different components are alternately produced at a regular period.

[13] In the apparatus for producing microdroplets according to the above [11], by the signal from the control device, microdroplets having uniform sizes and different components are alternately produced at a regular period.

[14] In the apparatus for producing microdroplets according to the above [12] or [13], by the signal from the control device, the period can be changed.

[15] In an apparatus for producing microdroplets according to the above [8], a liquid containing the microdroplets is supplied to another cross intersection portion to which the first continuous phase and the second continuous phase are supplied so as to produce double emulsion-microcapsules.

[16] There is provided a method for producing microdroplets, comprising the steps of: separating a liquid containing primary droplets and satellite droplets into the primary droplets and the satellite droplets at an expansion portion; and recovering the primary droplets and the satellite droplets in a primary droplet recovery channel and a satellite droplet recovery channel, respectively, at a branching portion.

[17] In the method for producing microdroplets according to the above [16], the primary droplets include first and second primary droplets and the satellite droplets include first and second satellite droplets, and at the branching portion, the first and the second primary droplets, the first satellite droplets, and the second satellite droplets are separately recovered.

[18] In the method for producing microdroplets according to the above [16], a liquid containing the satellite droplets is supplied to an intersection portion to which a first continuous phase and a second continuous phase are supplied to produce double emulsion-microcapsules.

[19] There is provided an apparatus for producing microdroplets, comprising: a microdroplet producing portion producing primary droplets and satellite droplets; a microdroplet supply channel supplying microdroplets from the microdroplet producing portion; an expansion portion connected to the microdroplet supply channel; and a branching portion having a satellite droplet recovery channel to recover the satellite droplets and a primary droplet recovery channel connected to a front end of the expansion portion to recover the primary droplets.

[20] There is provided an apparatus for producing microdroplets, comprising: a microdroplet producing portion producing first and second primary droplets and first and second satellite droplets; a microdroplet supply channel supplying microdroplets from the microdroplet producing portion; an expansion portion connected to the microdroplet supply channel; and a branching portion having a primary droplet recovery channel connected to a front end of the expansion portion to recover the first and the second primary droplets, a first satellite droplet recovery channel to recover the first satellite droplets, and a second satellite droplet recovery channel to recover the second satellite droplets.

BEST MODE FOR CARRYING OUT THE INVENTION

In a method for producing microdroplets, at a cross intersection portion at which a first continuous phase and a first and a second dispersion phase intersect with each other, different microdroplets are alternately produced by allowing the first dispersion phase and the second dispersion phase to alternately act on the first continuous phase. In addition, various types of microdroplets, in particular, double emulsion-microcapsules can be easily produced in a simple manner.

In addition, primary droplets and satellite droplets are easily separated and then can be recovered separately. In addition, by using the satellite droplets, high-quality and highly precise double emulsion-microcapsules can be manufactured.

Embodiments

Hereinafter, embodiments of the present invention will be described in detail.

Figure 1:
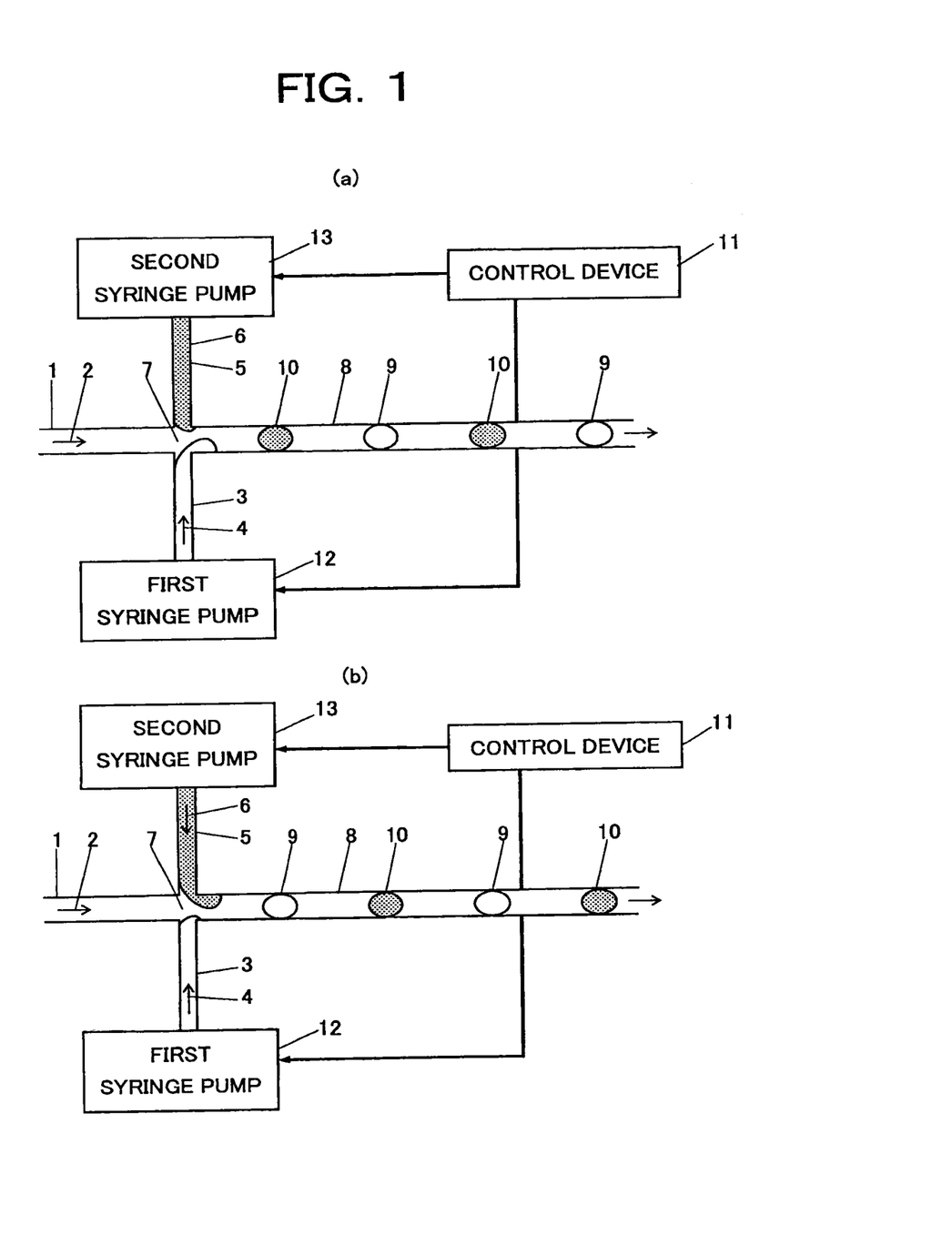
FIG. 1 includes schematic views each showing the state in which microdroplets are produced at a long period using a cross microchannel when a flow rate ratio between a dispersion phase and a continuous phase is small, according to a first embodiment of the present invention.

FIG. 1 includes schematic views each showing the state in which microdroplets are produced at a long period using a cross microchannel when a flow rate ratio between a dispersion phase and a continuous phase is small, according to a first embodiment of the present invention.

An embodiment will be described in which microdroplets having uniform sizes and different components are alternately produced at a regular period.

In FIG. 1, reference numeral 1 indicates a first microchannel, reference numeral 2 indicates a continuous phase supplied from the first microchannel 1, reference numeral 3 indicates a second microchannel, reference numeral 4 indicates a first dispersion phase supplied from the second microchannel 3, reference numeral 5 indicates a third microchannel, reference numeral 6 indicates a second dispersion phase supplied from the third microchannel 5, reference numeral 7 indicates an intersection portion having a cross structure, reference numeral 8 indicates a fourth microchannel, reference numeral 9 indicates a first microdroplet sent through the fourth microchannel 8, reference numeral 10 indicates a second microdroplet alternately produced with the first microdroplet 9 at a regular period, reference numeral 11 indicates a control device controlling supply of the first dispersion phase 4 and the second dispersion phase 6 in the microchannels, reference numeral 12 indicates a syringe pump (flow rate changeable liquid feed device) which is connected to the control device 11 and which is used as a first liquid feed device supplying the first dispersion phase 4, and reference numeral 13 indicates a syringe pump (flow rate changeable liquid feed device) which is connected to the control device 11 and which is used as a second liquid feed device supplying the second dispersion phase 6.

In this embodiment, using the cross intersection portion 7 of the microchannels, the microdroplets 9 and 10 having uniform sizes are produced at predetermined intervals, so that a line of the microdroplets is formed. That is, when the first syringe pump (flow rate changeable liquid feed device) 12 for the first dispersion phase 4 and the second syringe pump (flow rate changeable liquid feed device) 13 for the second dispersion phase 6 are alternately operated so as to feed the first dispersion phase 4 and the second dispersion phase 6 at the same flow rate, at an appropriate flow rate of the continuous phase 2, the microdroplets 9 and 10 having uniform sizes and different components are alternately produced at the cross intersection portion 7 at a regular period.

Figure 2:
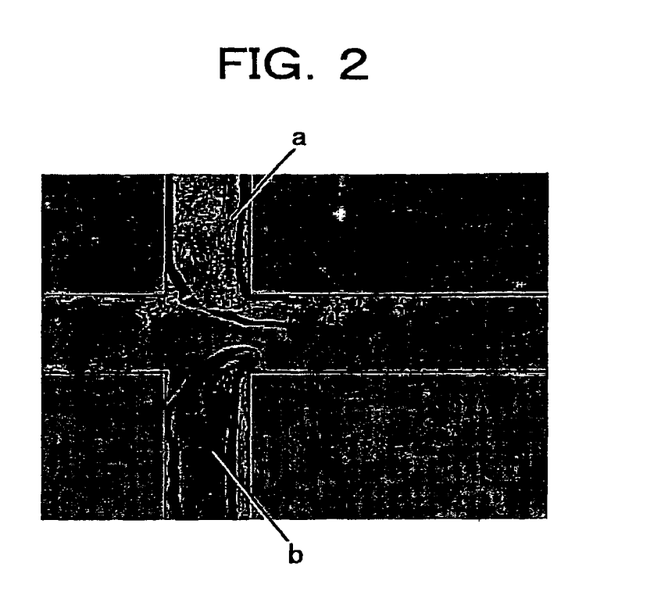
FIG. 2 is a view showing the state in which the droplets are alternately produced, as shown in FIG. 1.
Figure 3:
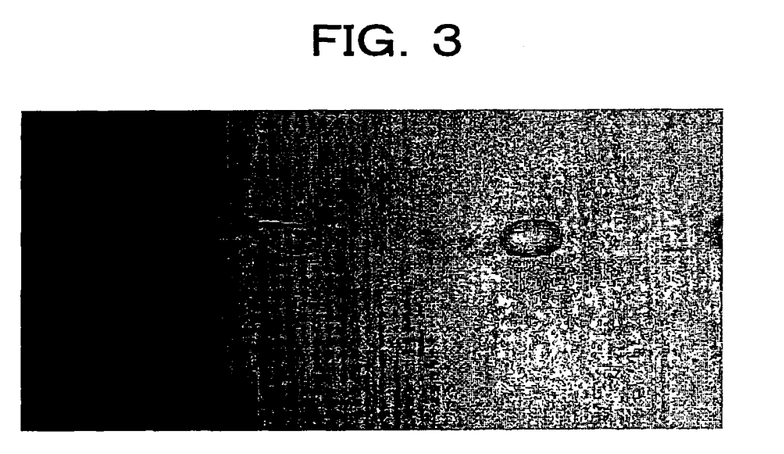
FIG. 3 is a photograph taken by a high-speed camera showing the state in which microdroplets having uniform sizes and different components are produced.

FIG. 2 is a view showing the state in which the microdroplets are alternately produced, and FIG. 3 is a photograph taken by a high-speed camera showing the state of production of microdroplets having uniform sizes and different components.

In this embodiment, a glass-made microchannel was used which had a channel width of 80 μm and a depth of 40 μm and which was processed by a hydrophobic treatment. As the dispersion phases shown in FIG. 2, a red ink a and a blue ink b each diluted with water were used as the first and the second dispersion phases, respectively, and each dispersion phase was supplied at a flow rate of 0.01 ml/h. A corn oil (viscosity: 58.5 mPa·s, surface tension: 33.2 mN/m (both being measured at 20° C.)) used as the continuous phase was supplied at a flow rate of 0.10 ml/h.

Figure 4:
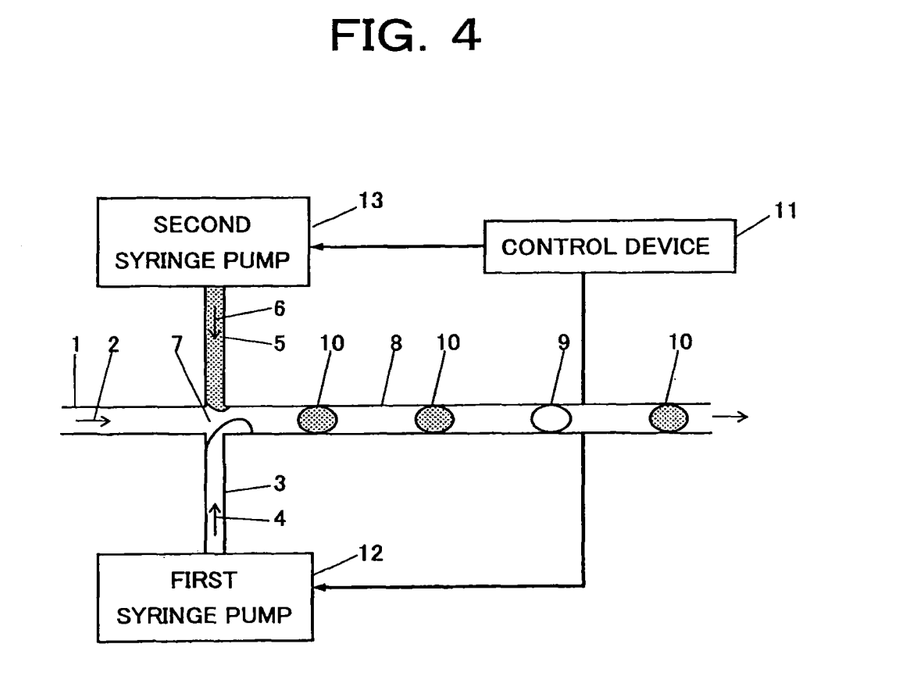
FIG. 4 is a view showing the state in which microdroplets are sequentially produced, according to a second embodiment of the present invention.

FIG. 4 is a view showing the state in which microdroplets are sequentially produced, according to a second embodiment of the present invention.

In this embodiment, at a cross intersection portion at which a first continuous phase, a first dispersion phase, and a second dispersion phase intersect with each other, the first dispersion phase and the second dispersion phase are allowed to act on the first continuous phase so as to produce different microdroplets, and in this case, by the control using the control device 11, when one droplet 9 is formed from the first dispersion phase, two droplets 10 are then continuously formed from the second dispersion phase.

Figure 5:
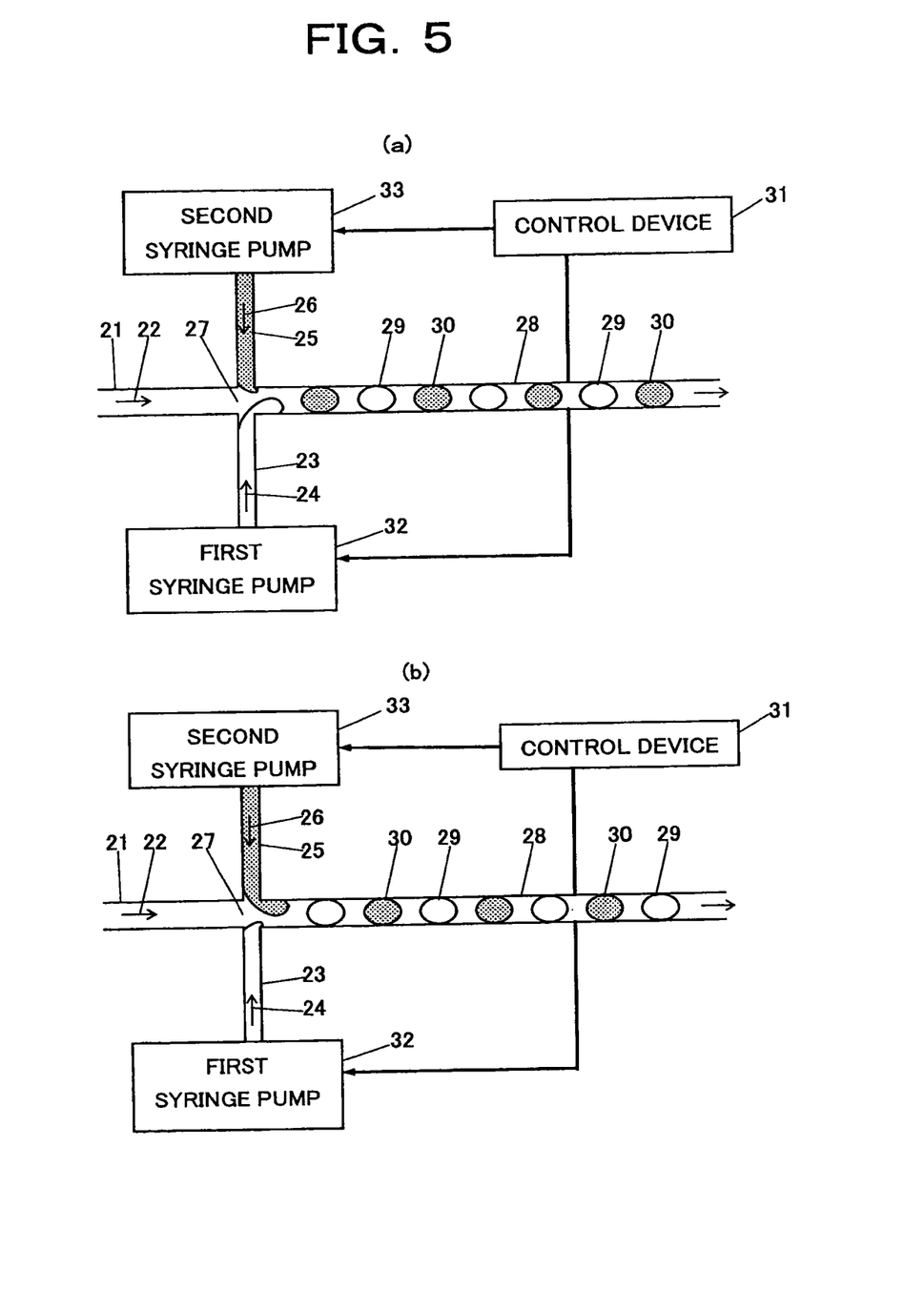
FIG. 5 includes schematic views of an apparatus showing the state in which microdroplets are produced at a short period using a cross microchannel when a flow rate ratio between a dispersion phase and a continuous phase is large, according to a third embodiment of the present invention.

FIG. 5 includes schematic views of an apparatus showing the state in which microdroplets are produced at a short period using a cross microchannel when a flow rate ratio between a dispersion phase and a continuous phase is large, according to a third embodiment of the present invention.

In this figure, reference numeral 21 indicates a first microchannel, reference numeral 22 indicates a continuous phase supplied from the first microchannel 21, reference numeral 23 indicates a second microchannel, reference numeral 24 indicates a first dispersion phase supplied from the second microchannel 23, reference numeral 25 indicates a third microchannel, reference numeral 26 indicates a second dispersion phase supplied from the third microchannel 25, reference numeral 27 indicates an intersection portion having a cross structure, reference numeral 28 indicates a fourth microchannel, reference numeral 29 indicates a first microdroplet sent through the fourth microchannel 28, reference numeral 30 indicates a second microdroplet alternately produced with the first microdroplet 29 at a regular period, reference numeral 31 indicates a control device controlling supply of the first dispersion phase 24 and the second dispersion phase 26 in the microchannels, reference numeral 32 indicates a first syringe pump (flow rate changeable liquid feed device) which is connected to the control device 31 and which is used as a first liquid feed device supplying the first dispersion phase 24, and reference numeral 33 indicates a second syringe pump (flow rate changeable liquid feed device) which is connected to the control device 31 and which is used as a second liquid feed device supplying the second dispersion phase 26.

In this third embodiment, the microdroplets 29 and 30 are produced at a shorter period compared to the case in which the microdroplets 9 and 10 are alternately produced in the first embodiment shown in FIG. 1.

Figure 6:
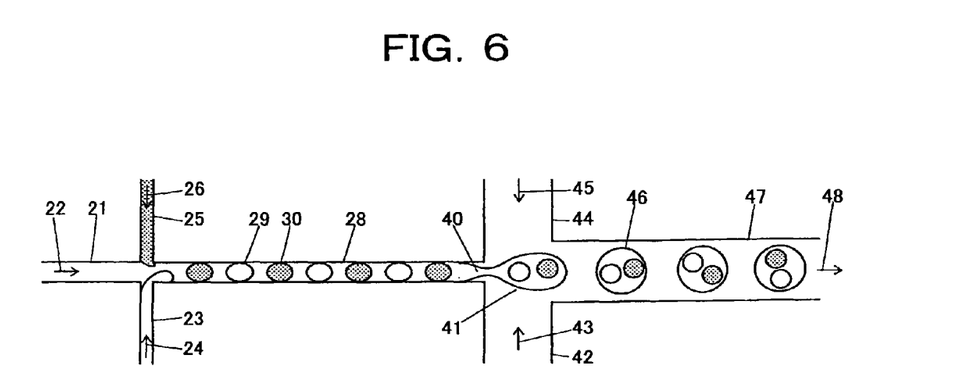
FIG. 6 is a schematic view showing the state of a fourth embodiment according to the present invention in which double emulsion-microcapsules are produced by using microdroplets which have uniform sizes and have different components and which are alternately produced at a regular period in the third embodiment.

FIG. 6 is a schematic view showing the state of a fourth embodiment according to the present invention in which double emulsion-microcapsules are produced by using microdroplets which have uniform sizes and have different components and which are alternately produced at a regular period in the third embodiment.

In this embodiment, reference numeral 40 indicates an outlet for ejecting two types of microdroplets, that is, the microdroplets 29 and 30 which are alternately produced at a regular period and which have uniform sizes and different components, reference numeral 41 indicates an intersection portion having a cross structure, reference numeral 42 indicates a fifth microchannel, reference numeral 43 indicates a continuous phase supplied from the fifth microchannel 42, reference numeral 44 indicates a sixth microchannel, reference numeral 45 indicates a continuous phase supplied from the sixth microchannel 44, reference numeral 46 indicates a produced microcapsule (double emulsion), reference numeral 47 indicates a microcapsule (double emulsion) recovery channel recovering the microcapsules (double emulsion) 46, and reference numeral 48 indicates a continuous phase sending the microcapsule (double emulsion) 46.

As described above, the microdroplets 29 and 30 alternately produced at a regular period and having different components are further encapsulated, so that the microcapsules (double emulsion) 46 containing the same numbers of two types of microdroplets are obtained.

Figure 7:
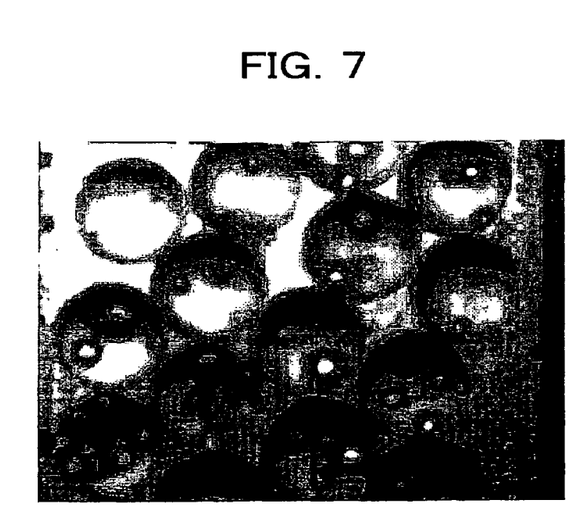
FIG. 7 is a view showing the state of production of a W/O/W type emulsion encapsulating two types of microdroplets, according to the present invention.

FIG. 7 is a view showing the state of production of a W/O/W type emulsion encapsulating two types of microdroplets, according to the present invention.

Next, as for a method for producing microdroplets using microchannels, a method for obtaining a monodispersion emulsion will be described in which satellite droplets are separated and removed from microdroplets produced in the microchannels.

Figure 8:
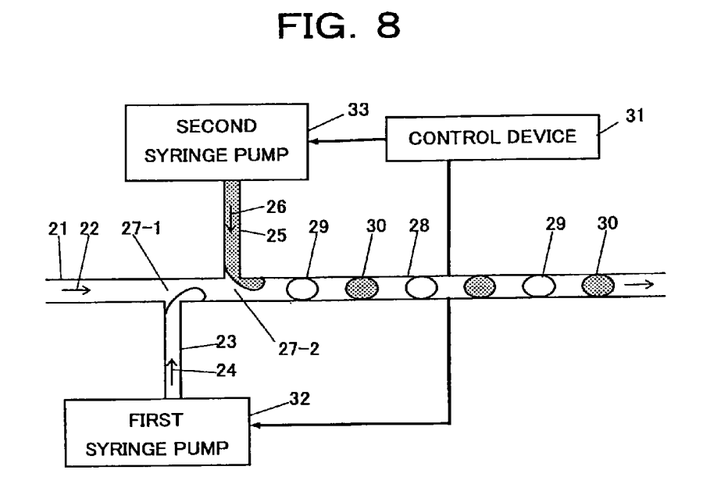
FIG. 8 is a schematic view showing a modified embodiment according to the first embodiment of the present invention.

FIG. 8 is a schematic view showing a modified embodiment according to the first embodiment of the present invention.

In this embodiment, the structure is formed in which different droplets are ejected from a T-shaped intersection portion 27-1 and a T-shaped intersection portion 27-2 which is located at a position shifted therefrom, and the first microdroplets 29 sent through the fourth microchannel 28 and the second microdroplets 30 alternately produced with the first microdroplets 29 at a regular period are sequentially produced. The rest of the structure is equivalent to that in the first embodiment.

Figure 9:
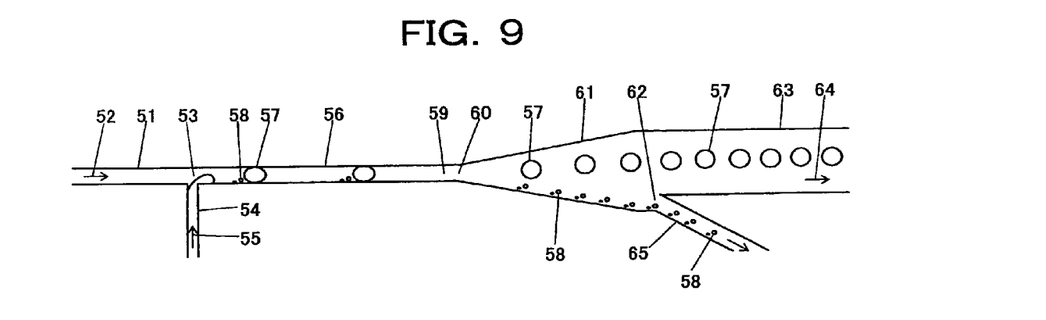
FIG. 9 is a schematic view showing the state of separation of satellite droplets, according to a fifth embodiment of the present invention.

FIG. 9 is a schematic view showing the state of separation of satellite droplets, according to a fifth embodiment of the present invention.

In this figure, reference numeral 51 indicates a first microchannel (continuous phase supply channel), reference numeral 52 indicates a continuous phase supplied from the first microchannel (continuous phase supply channel) 51, reference numeral 53 indicates an intersection portion having a T-shaped structure, reference numeral 54 indicates a second microchannel (dispersion phase supply channel), reference numeral 55 indicates a dispersion phase supplied from the second microchannel (dispersion phase supply channel) 54, reference numeral 56 indicates a third microchannel, reference numeral 57 indicates a primary droplet produced at the intersection portion 53 having a T-shaped structure and sent through the third microchannel 56, reference numeral 58 indicates a satellite droplet produced together with the primary droplet 57, reference numeral 59 indicates an outlet of the third microchannel 56, reference numeral 60 indicates a junction portion of a microchannel connected to the outlet 59, reference numeral 61 indicates an expansion portion (tapered portion) of the microchannel, reference numeral 62 indicates a branching portion, reference numeral 63 indicates a primary droplet recovery channel recovering the primary droplets 57, reference numeral 64 indicates a liquid carrying the primary droplets, and reference numeral 65 indicates a satellite droplet recovery channel recovering the satellite droplets 58.

As shown in FIG. 9, when the primary droplets 57 are produced at the intersection portion 53 having a T-shaped structure, the fine satellite droplets 58 are simultaneously produced. In the case in which microcapsules (double emulsion) are produced using the primary droplets 57, it is often unfavorable if the satellite droplets 58 are encapsulated in the microcapsules (double emulsion) together with the primary droplets 57.

Accordingly, in order to avoid the case described above, at the expansion portion 61, the primary droplets 57 are designed to be sent to the right side in the same manner as that before, and the satellite droplets 58 are designed to be sent downward, that is, the primary droplets 57 are sent toward the primary droplet recovery channel 63, and the satellite droplets 58 are sent downward to the satellite droplet recovery channel 65 recovering the satellite droplets 58.

According to this embodiment, the expansion portion (tapered portion) 61 and the branching microchannels 63 and 65 are provided downstream of the microdroplet production portion (intersection portion having a T-shaped structure) 53, and the satellite droplets 58 can be continuously separated from the primary droplets 57 thus formed.

Figure 10:
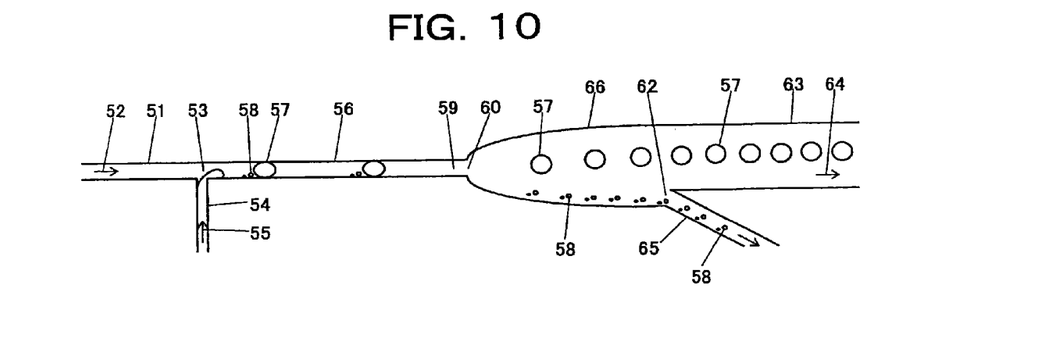
FIG. 10 is a view showing a modified embodiment according to the fifth embodiment shown in FIG. 9.

Instead of the expansion portion 61 having a taper described above, an expansion portion 66 having a curved surface may be used, as shown in FIG. 10.

Figure 11:
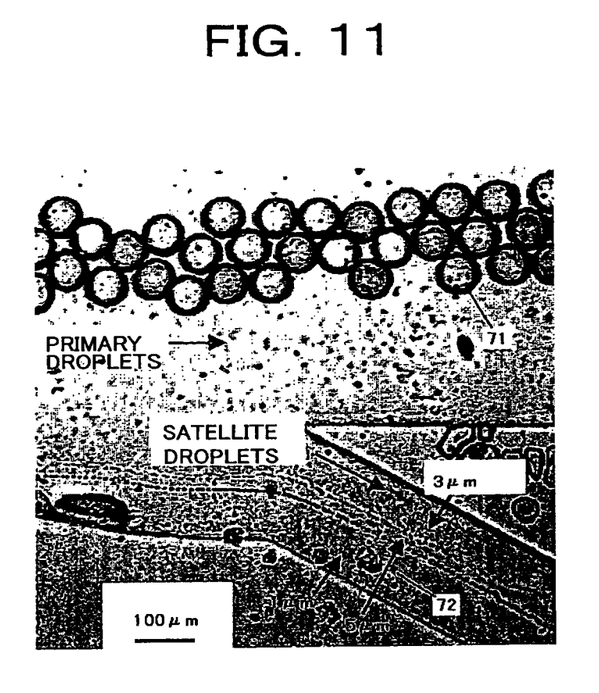
FIG. 11 is a view showing the state of separation of satellite droplets according to the present invention.

FIG. 11 is a view showing the state of separation of satellite droplets according to the present invention.

As shown in this figure, primary droplets (diameter: 70 μm) 71 are separated from satellite droplets 72 (diameters: 1, 3, and 5 μm).

Figure 12:
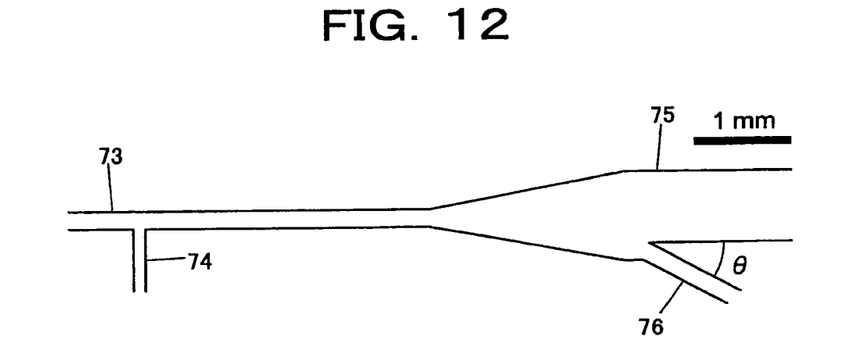
FIG. 12 is a view showing the shape of an acrylic resin-made microchannel shown in FIG. 11.

FIG. 12 is a view showing the shape of an acrylic resin-made microchannel shown in FIG. 11, this microchannel is formed of a first microchannel (continuous phase supply channel) 73 of 200 μm wide and 100 μm deep, a second microchannel (dispersion phase supply channel) 74 of 120 μm wide and 100 μm deep, a primary droplet recovery channel 75 of 800 μm wide and 100 μm deep, and a satellite droplet recovery channel 76 of 200 μm wide and 100 μm deep, and in addition, the branching angle θ of the satellite droplet recovery channel 76 to the primary droplet recovery channel 75 is 30°.

In this embodiment, as the dispersion phase and the continuous phase, pure water and a corn oil (viscosity: 58.5 mPa·s, surface tension: 33.2 mN/m, both being measured at 20° C.) were used, respectively, and the flow rate control was performed for each phase by a liquid feed device (syringe pump).

As for the flow rate conditions in FIG. 11, the dispersion phase flow rate and the continuous phase flow rate were set to 1.0 ml/h and 15.0 ml/h, respectively, and it was confirmed that the primary droplets 71 (diameter: approximately 70 μm) were separated from the satellite droplets 72 having three different sizes (diameters: 1, 3, and 5 μm). It was observed that the satellite droplets having different sizes form respective lines and flow into the branching channel. When the flow rate of the dispersion phase and that of the continuous phase are increased, the size of the satellite droplets and the production number thereof both tend to be increased.

Figure 13:
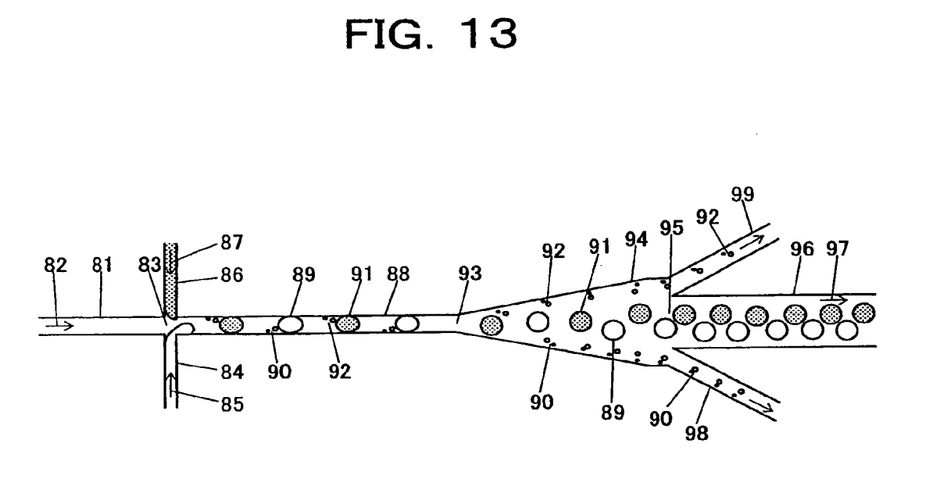
FIG. 13 is a schematic view showing the state of separation of satellite droplets, according to a sixth embodiment of the present invention.

FIG. 13 is a schematic view showing the state of separation of satellite droplets, according to a sixth embodiment of the present invention.

In this figure, reference numeral 81 indicates a first microchannel (continuous phase supply channel), reference numeral 82 indicates a continuous phase supplied from the first microchannel (continuous phase supply channel), reference numeral 83 indicates an intersection portion having a cross structure, reference numeral 84 indicates a second microchannel (first dispersion phase supply channel), reference numeral 85 indicates a first dispersion phase supplied from the second microchannel (first dispersion phase supply channel) 84, reference numeral 86 indicates a third microchannel (second dispersion phase supply channel), reference numeral 87 indicates a second dispersion phase supplied from the third microchannel (second dispersion phase supply channel) 86, reference numeral 88 indicates a fourth microchannel, reference numeral 89 indicates a first primary droplet produced at the intersection portion 83 having a cross structure, reference numeral 90 indicates a first satellite droplet produced simultaneously with the first primary droplet 89, reference numeral 91 indicates a second primary droplet produced at the intersection portion 83 having a cross structure, reference numeral 92 indicates a second satellite droplet produced simultaneously with the second primary droplet 91, reference numeral 93 indicates a junction portion of a microchannel connected to an outlet ejecting the droplets 89 to 92, reference numeral 94 indicates an expansion portion (tapered portion) of the microchannel, reference numeral 95 indicates a branching portion, reference numeral 96 indicates a primary droplet recovery channel recovering the primary droplets 89 and 91, reference numeral 97 indicates a liquid carrying the primary droplets 89 and 91, reference numeral 98 indicates a first satellite droplet recovery channel recovering the first satellite droplets 90, and reference numeral 99 indicates a second satellite droplet recovery channel recovering the second satellite droplets 92.

In this embodiment, the expansion portion (tapered portion) 94 and the first and the second satellite droplet recovery channels 98 and 99 are provided downstream of the microdroplet production portion (intersection portion having a cross structure) 83, and the first and the second satellite droplets 90 and 92 can be independently separated from the primary droplets 89 and 91.

According to the structure described above, the droplet production and the classification operation can be simultaneously performed in the microchannels, and monodispersion droplets/fine particles can be advantageously obtained without classification operation performed outside the apparatus.

The satellite droplets thus separated and recovered are very fine, and hence these droplets can be used for production of a double emulsion.

Figure 14:
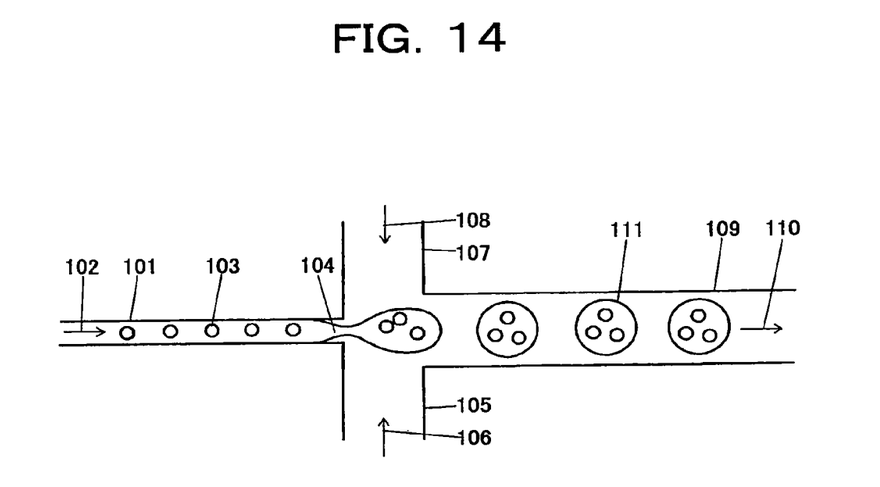
FIG. 14 is a schematic view showing the state of production of a double emulsion using satellite droplets, according to a seventh embodiment of the present invention.

FIG. 14 is a schematic view showing the state of production of a double emulsion using satellite droplets, according to a seventh embodiment of the present invention.

In this figure, reference numeral 101 indicates a first microchannel (satellite droplet supply channel), reference numeral 102 indicates a liquid carrying satellite droplets, reference numeral 103 indicates a satellite droplet, reference numeral 104 indicates an outlet for the satellite droplets, reference numeral 105 indicates a second microchannel (continuous phase supply channel), reference numeral 106 indicates a first continuous phase supplied from the second microchannel (continuous phase supply channel) 105, reference numeral 107 indicates a third microchannel (continuous phase supply channel), reference numeral 108 indicates a second continuous phase supplied from the third microchannel (continuous phase supply channel) 107, reference numeral 109 indicates a recovery channel for a double emulsion using satellite droplets, reference numeral 110 indicates a liquid carrying the double emulsion using satellite droplets, and reference numeral 111 indicates the double emulsion using satellite droplets.

According to this embodiment, as shown in FIG. 14, the double emulsion 111 encapsulating the satellite droplets 103 can be produced.

Incidentally, the present invention is not limited to the above examples, and various modifications may be carried out without departing from the sprit and the scope of the present invention and may not be excluded therefrom.

According to the present invention, using intersecting microchannels in combination, various types of microdroplets, in particular, double emulsion-microcapsules can be easily produced in a simple manner.

In addition, the primary droplets and the satellite droplets can be easily separated and recovered separately. Accordingly, high-quality and highly precise double emulsion-microcapsules can be manufactured.

INDUSTRIAL APPLICABILITY

The method for producing microdroplets and the apparatus therefor, according to the present invention, can be used as a tool producing microcapsules in the fields of gene and pharmaceutical technologies.

The invention claimed is:

1. A method for producing microdroplets, comprising a step of allowing a first dispersion phase of a first substance and a second dispersion phase of a second substance to act on a same first continuous phase at an intersection portion of the first continuous phase, the first dispersion phase, and the second dispersion phase, whereby microdroplets containing the first dispersion phase and microdroplets containing the second dispersion phase are sequentially produced at the intersection portion based on a plurality of single dispersions, each of the first dispersion phase and the second dispersion phase being dispersed into the same first continuous phase, wherein the method includes at least one sequence of alternately producing single dispersions of each of the first dispersion phase and the second dispersion phase.

2. The method for producing microdroplets, according to claim 1, wherein the intersection portion is a cross intersection portion.

3. The method for producing microdroplets, according to claim 2, wherein the first dispersion phase and the second dispersion phase are allowed to alternately act on at predetermined time intervals so that microdroplets having uniform sizes and different components are alternately produced at a regular period.

4. The method for producing microdroplets, according to claim 3, wherein the period is changeable.

5. A method for producing microdroplets, comprising the steps of:
allowing a first dispersion phase of a first substance and a second dispersion phase of a second substance to act on a same first continuous phase at a cross intersection portion of the first continuous phase, the first dispersion phase, and the second dispersion phase so as to sequentially produce microdroplets containing the first dispersion phase and microdroplets containing the second dispersion phase based on a plurality of single dispersions, each of the first dispersion phase and the second dispersion phase being dispersed into the same first continuous phase, wherein the method includes at least one sequence of alternately producing single dispersions of each of the first dispersion phase and the second dispersion phase; and
supplying a liquid containing the microdroplets containing the first dispersion phase and microdroplets containing the second dispersion phase to another cross intersection portion to which the first continuous phase and a second continuous phase are supplied, whereby double emulsion-microcapsules including at least one microdroplet containing the first dispersion phase and at least one microdroplet containing the second dispersion phase are produced.

6. A method for producing microdroplets, comprising the steps of:
allowing a first dispersion phase of a first substance and a second dispersion phase of a second substance to act on a same first continuous phase at an intersection portion of the first continuous phase, the first dispersion phase, and the second dispersion phase, whereby microdroplets containing the first dispersion phase and microdroplets containing the second dispersion phase are sequentially produced at the intersection portion based on a plurality of single dispersions, each of the first dispersion phase and the second dispersion phase being dispersed into the same first continuous phase, wherein the method includes at least one sequence of alternately producing single dispersions of each of the first dispersion phase and the second dispersion phase, the microdroplets comprising primary droplets and satellite droplets;
separating a liquid containing primary droplets and satellite droplets into the primary droplets and the satellite droplets at an expansion portion; and
recovering the primary droplets and the satellite droplets in a primary droplet recovery channel and a satellite droplet recovery channel, respectively, at a branching portion.

7. The method for producing microdroplets, according to claim 6, wherein the primary droplets comprise first primary droplets containing the first dispersion phase and second primary droplets containing the second dispersion phase, and the satellite droplets comprise first satellite droplets containing the first dispersion phase and second satellite droplets containing the second dispersion phase, and at the branching portion, the first and the second primary droplets, the first satellite droplets, and the second satellite droplets are separately recovered.

8. The method for producing microdroplets, according to claim 6, wherein a liquid containing the satellite droplets is supplied to an intersection portion to which the first continuous phase and a second continuous phase are supplied, whereby double emulsion-microcapsules are produced.

* * * * *